(12) United States Patent
Sheng et al.

(10) Patent No.: US 11,172,080 B2
(45) Date of Patent: Nov. 9, 2021

(54) PERIPHERAL AND CONTROL METHOD OF CONTROL COMPONENT THEREOF

(71) Applicant: AVISION INC., Hsinchu (TW)

(72) Inventors: Shao-Lan Sheng, Hsinchu (TW); Chia-Ching Lin, Hsinchu (TW); Xiang Chi Lee, Taoyuan (TW)

(73) Assignee: AVISION INC., Hsinchu (TW)

( * ) Notice: Subject to any disclaimer, the term of this patent is extended or adjusted under 35 U.S.C. 154(b) by 0 days.

(21) Appl. No.: 16/511,889

(22) Filed: Jul. 15, 2019

(65) Prior Publication Data

US 2020/0084323 A1 Mar. 12, 2020

(30) Foreign Application Priority Data

Sep. 7, 2018 (TW) .................. 107131454

(51) Int. Cl.
*H04N 1/00* (2006.01)

(52) U.S. Cl.
CPC ..... *H04N 1/00384* (2013.01); *H04N 1/00037* (2013.01); *H04N 1/00496* (2013.01)

(58) Field of Classification Search
None
See application file for complete search history.

(56) References Cited

U.S. PATENT DOCUMENTS

| | | | | |
|---|---|---|---|---|
| 4,068,950 A | * | 1/1978 | Kito | G03B 27/6221 |
| | | | | 355/75 |
| 4,633,080 A | * | 12/1986 | Wilman | H04N 1/10 |
| | | | | 250/234 |
| 4,763,163 A | * | 8/1988 | Hamano | G03B 27/625 |
| | | | | 399/85 |
| 4,777,533 A | * | 10/1988 | Watanabe | B41J 32/00 |
| | | | | 358/476 |
| 4,866,486 A | * | 9/1989 | Higashio | G03G 15/50 |
| | | | | 399/184 |
| 4,899,228 A | * | 2/1990 | Sano | H04N 1/0402 |
| | | | | 347/224 |

(Continued)

FOREIGN PATENT DOCUMENTS

| | | |
|---|---|---|
| CN | 102340629 A | 2/2012 |
| CN | 102694945 A | 9/2012 |

(Continued)

OTHER PUBLICATIONS

Taiwanese Office Action based on corresponding Application No. 107131454; dated Jan. 14, 2020.

*Primary Examiner* — Anh-Vinh Thi Nguyen
(74) *Attorney, Agent, or Firm* — Muncy, Geissler, Olds & Lowe, P.C.

(57) ABSTRACT

A peripheral includes a body, an image processing device and a processor. The body includes a sub-housing and a second button. The sub-housing includes a control component. The control component includes a first button disposed on an upper surface of the sub-housing. The second button and the first button are disposed on different adjacent surfaces. The image processing device is disposed above or in the body. The image processing device is disposed above the body. The processor controls a first signal generated by the first button to be the same as a first signal generated by the second button. The sub-housing is disposed on an upper lateral side of the body.

18 Claims, 7 Drawing Sheets

(56) References Cited

U.S. PATENT DOCUMENTS

| | | | | |
|---|---|---|---|---|
| 4,947,262 A * | 8/1990 | Yajima | H04N 1/0476 |
| | | | 358/296 |
| 5,006,895 A * | 4/1991 | Hashimoto | G03G 15/302 |
| | | | 355/25 |
| 5,526,098 A * | 6/1996 | Peck | G03B 27/6221 |
| | | | 355/75 |
| 5,534,865 A * | 7/1996 | Kriegsman | H01H 9/0235 |
| | | | 341/176 |
| 5,597,307 A * | 1/1997 | Redford | G06F 9/445 |
| | | | 434/118 |
| 5,995,245 A * | 11/1999 | Moro | H04N 1/02409 |
| | | | 358/474 |
| 6,011,635 A * | 1/2000 | Bungo | H04N 1/387 |
| | | | 358/463 |
| 6,057,936 A * | 5/2000 | Obara | G03G 15/6552 |
| | | | 358/296 |
| 6,281,983 B1 * | 8/2001 | Takahashi | H04N 1/00408 |
| | | | 358/1.2 |
| 9,550,371 B2 * | 1/2017 | Preliasco | B41J 17/32 |
| 2002/0191994 A1 * | 12/2002 | Lee | H04N 1/1026 |
| | | | 399/362 |
| 2004/0048621 A1 * | 3/2004 | Takahashi | H04N 1/00501 |
| | | | 455/456.3 |
| 2005/0128239 A1 * | 6/2005 | Tanaka | B41J 19/202 |
| | | | 347/19 |
| 2006/0033967 A1 * | 2/2006 | Brunner | G06K 9/033 |
| | | | 358/474 |
| 2006/0095542 A1 * | 5/2006 | Reddy | H04N 1/32117 |
| | | | 709/217 |
| 2006/0152773 A1 * | 7/2006 | Wu | H04N 1/10 |
| | | | 358/474 |
| 2007/0013976 A1 | 1/2007 | Luo | |
| 2007/0024924 A1 * | 2/2007 | Ikeno | H04N 1/00493 |
| | | | 358/474 |
| 2007/0109609 A1 * | 5/2007 | Guo | H04N 1/00519 |
| | | | 358/474 |
| 2007/0201100 A1 * | 8/2007 | Ikeno | H04N 1/00408 |
| | | | 358/296 |
| 2007/0228232 A1 * | 10/2007 | Ikeno | G03G 15/5016 |
| | | | 248/157 |
| 2007/0253031 A1 * | 11/2007 | Fan | H04N 1/00718 |
| | | | 358/3.27 |
| 2009/0002781 A1 | 1/2009 | Luo | |
| 2010/0079821 A1 * | 4/2010 | Hirano | H04N 1/00795 |
| | | | 358/448 |
| 2010/0157381 A1 * | 6/2010 | Chen | H04N 1/00779 |
| | | | 358/449 |
| 2011/0043870 A1 * | 2/2011 | Watanabe | H04N 1/00973 |
| | | | 358/474 |
| 2011/0292432 A1 * | 12/2011 | Matsusaka | H04N 1/00427 |
| | | | 358/1.14 |
| 2011/0299123 A1 * | 12/2011 | Utsumi | G06F 3/1222 |
| | | | 358/1.15 |
| 2012/0019680 A1 | 1/2012 | Shimada et al. | |
| 2012/0243042 A1 | 9/2012 | Uchida | |
| 2012/0320396 A1 * | 12/2012 | Kurahashi | H04N 1/00549 |
| | | | 358/1.13 |
| 2013/0016384 A1 | 1/2013 | Jo | |
| 2013/0077221 A1 * | 3/2013 | Becze | G06F 16/51 |
| | | | 361/679.3 |
| 2013/0308159 A1 * | 11/2013 | Yoshimura | H04N 1/00347 |
| | | | 358/1.15 |
| 2013/0314753 A1 * | 11/2013 | Brewer, III | H04N 1/3877 |
| | | | 358/448 |
| 2014/0072358 A1 * | 3/2014 | Tomomatsu | B41J 3/4075 |
| | | | 400/583 |
| 2014/0139857 A1 * | 5/2014 | Maeda | G06K 15/16 |
| | | | 358/1.12 |
| 2014/0146334 A1 * | 5/2014 | Yuzawa | H04N 1/04 |
| | | | 358/1.13 |
| 2014/0253949 A1 * | 9/2014 | Tsujimoto | H04N 1/0084 |
| | | | 358/1.14 |
| 2014/0292691 A1 * | 10/2014 | Sugiyama | H04N 1/00411 |
| | | | 345/173 |
| 2014/0374982 A1 | 12/2014 | Jo | |
| 2015/0304514 A1 | 10/2015 | Sheng | |
| 2016/0170695 A1 * | 6/2016 | Sakashita | G06K 9/2063 |
| | | | 358/1.15 |
| 2016/0191730 A1 * | 6/2016 | Ohata | H04N 1/00411 |
| | | | 358/1.15 |
| 2016/0224289 A1 * | 8/2016 | Yamanaka | H04N 1/00411 |
| 2017/0034370 A1 | 2/2017 | Kurita | |
| 2017/0366704 A1 | 12/2017 | Li et al. | |
| 2018/0034986 A1 * | 2/2018 | Ishida | H04N 1/00551 |
| 2018/0234563 A1 * | 8/2018 | Ido | H04N 1/32683 |
| 2018/0239130 A1 * | 8/2018 | Ueda | G02B 26/123 |
| 2019/0166263 A1 * | 5/2019 | Furusawa | H04N 1/00488 |
| 2020/0233420 A1 * | 7/2020 | Liu | G05D 1/0274 |

FOREIGN PATENT DOCUMENTS

| | | |
|---|---|---|
| JP | 2001337501 A | 12/2001 |
| TW | 592994 B | 6/2004 |
| TW | 200704144 A | 1/2007 |
| TW | 201304498 A | 1/2013 |
| TW | 201540551 A | 11/2015 |
| TW | 201801508 A | 1/2018 |

* cited by examiner

PERIPHERAL AND CONTROL METHOD OF CONTROL COMPONENT THEREOF

CROSS-REFERENCE TO RELATED APPLICATIONS

This application claims priority of No. 107131454 filed in Taiwan R.O.C. on Sep. 7, 2018 under 35 USC 119, the entire content of which is hereby incorporated by reference.

BACKGROUND OF THE INVENTION

Field of the Invention

This disclosure relates to a peripheral and a control method of a control component thereof, and more particularly to a peripheral capable of solving operation problems when a medium covers a control component of the peripheral, and a control method of the control component thereof.

Description of the Related Art

When a user uses a peripheral to perform data processing and the medium (sheet) has the too-large area exceeding the area of the flatbed scanner, or the area of the medium exceeds the boundary of the flatbed scanner due to the placement position of the medium, control components of the peripheral facing the user are covered by the medium and the user cannot see the control components. Thus, the user cannot conveniently operate the peripheral.

FIG. 1 is a schematic view showing the prior art. When the user wants to use a conventional peripheral 1 to scan or print the data on the book, a scan area of a flatbed scanner disposed above a body 10 of the peripheral 1 cannot support the areas of two sides of the opened book, and the book (medium D) covers control components on a sub-body 110 so that the user cannot operate the peripheral 1.

Such the condition tends to occur on a desktop peripheral, a mini-type peripheral, or a peripheral having a flatbed scanner for scanning an A4-sized medium.

BRIEF SUMMARY OF THE INVENTION

It is therefore an object of this disclosure to provide the technology capable of solving the above-mentioned problems of the operation difficulty when the peripheral is processing the medium according to the user's operation and the area of the medium cannot match with the area of the flatbed scanner, and more particularly when the medium covers the control components of the peripheral.

To achieve the above-mentioned object, this disclosure provides a peripheral including a body, an image processing device and a processor. The body includes a sub-housing and a second button. The sub-housing includes a control component. The control component includes a first button and is disposed on an upper surface of the sub-housing. The second button and the first button are disposed on different adjacent surfaces. The image processing device is disposed above or in the body. The processor controls a first signal generated by the first button to be the same as a first signal generated by the second button. The sub-housing is disposed on an upper lateral side or one side portion of the body.

To achieve the above-mentioned object, this disclosure further provides another peripheral including a body, an image processing device, a processor and a sensing device. The body includes a sub-housing and a second button. The sub-housing includes a control component. The control component includes a first button. The control component is disposed on an upper surface of the sub-housing. The second button and the first button are disposed on different adjacent surfaces. The image processing device is disposed above or in the body. The sensing device senses whether a medium is present on or above the sub-housing. The image processing device is disposed above or in the body. The processor controls a first signal generated by the first button to be the same as a first signal generated by the second button. The sub-housing is disposed on an upper lateral side or one side portion of the body.

To achieve the above-mentioned object, this disclosure further provides a control method of a peripheral. The control method includes: receiving, by a processor, a sensing signal of a sensing device; transmitting, by the processor, a second signal according to the sensing signal; and disabling, by the processor, a path, through which a control component transmits a first signal to the processor, while enabling a path, through which a second button transmits the first signal to the processor.

To achieve the above-mentioned object, this disclosure further provides another control method of a peripheral. The control method includes: receiving, by a processor, a sensing signal of a sensing device; transmitting, by the processor, a second signal according to the sensing signal; and disabling, by the processor, a path, through which a control component transmits a first signal to the processor, while keeping enabling a path, through which a second button transmits the first signal to the processor.

In summary, when the peripheral in this disclosure includes the conventional control component, which is disposed on the body, faces the user and is for operating the peripheral, and further includes a second button, which is for correspondingly operating the image processing device, and disposed on the side surface or side portion of the body or the sub-housing to function as the reserve control button when the control panel is covered by the medium. Consequently, the user is free from the trouble of operating the peripheral when the control component is covered by the medium, and the convenience of use can be enhanced.

Further scope of the applicability of this disclosure will become apparent from the detailed description given hereinafter. However, it should be understood that the detailed description and specific examples, while indicating preferred embodiments of this disclosure, are given by way of illustration only, since various changes and modifications within the spirit and scope of this disclosure will become apparent to those skilled in the art from this detailed description.

DETAILED DESCRIPTION OF THE INVENTION

Directional terms, such as up, down, left, right, front, back and the like, mentioned in the following examples, only refer to the directions of the accompanying drawings. Thus, the directional terms are used to describe but not to limit this disclosure.

Figure 1:
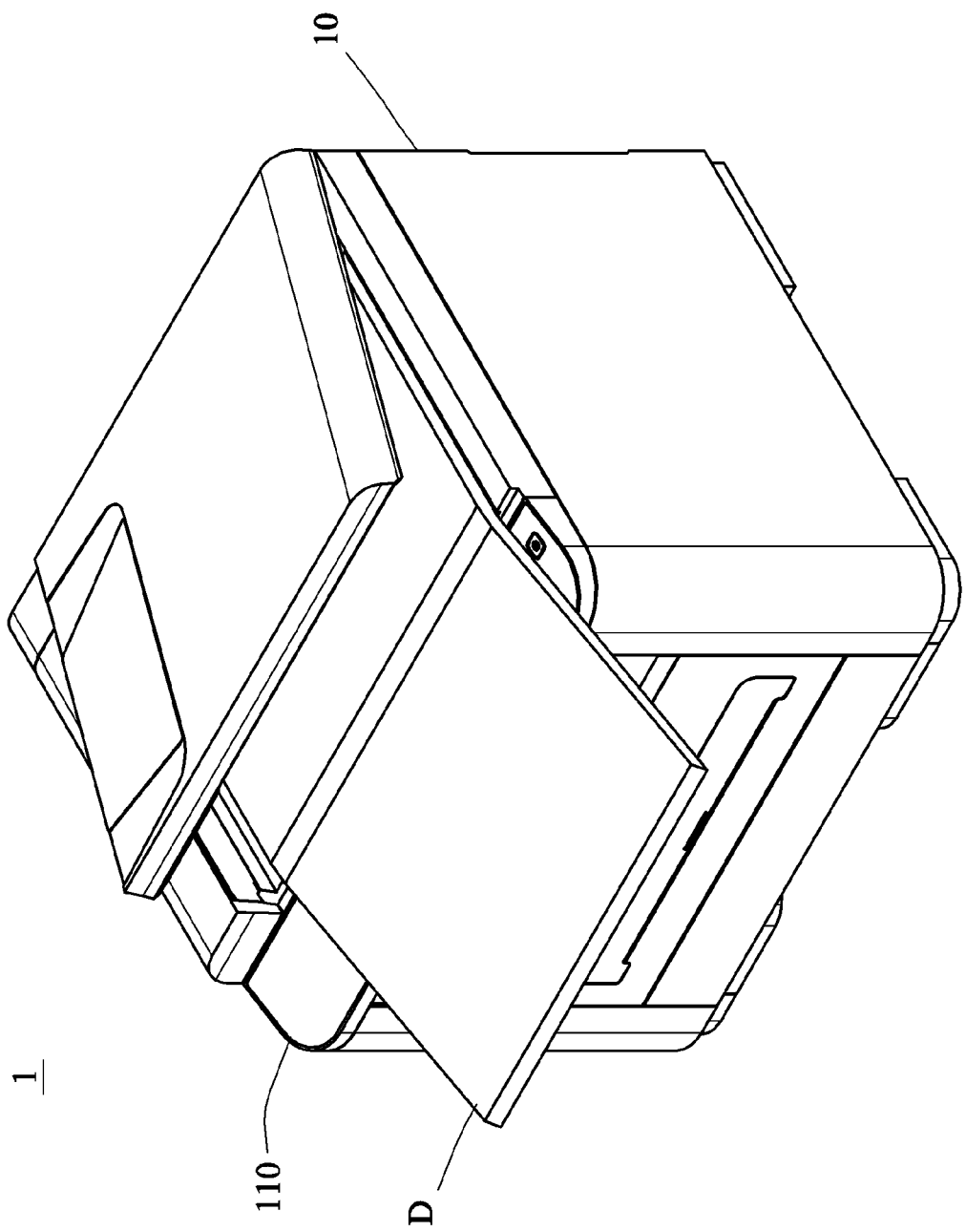
FIG. 1 is a schematic view showing the prior art.
Figure 2:
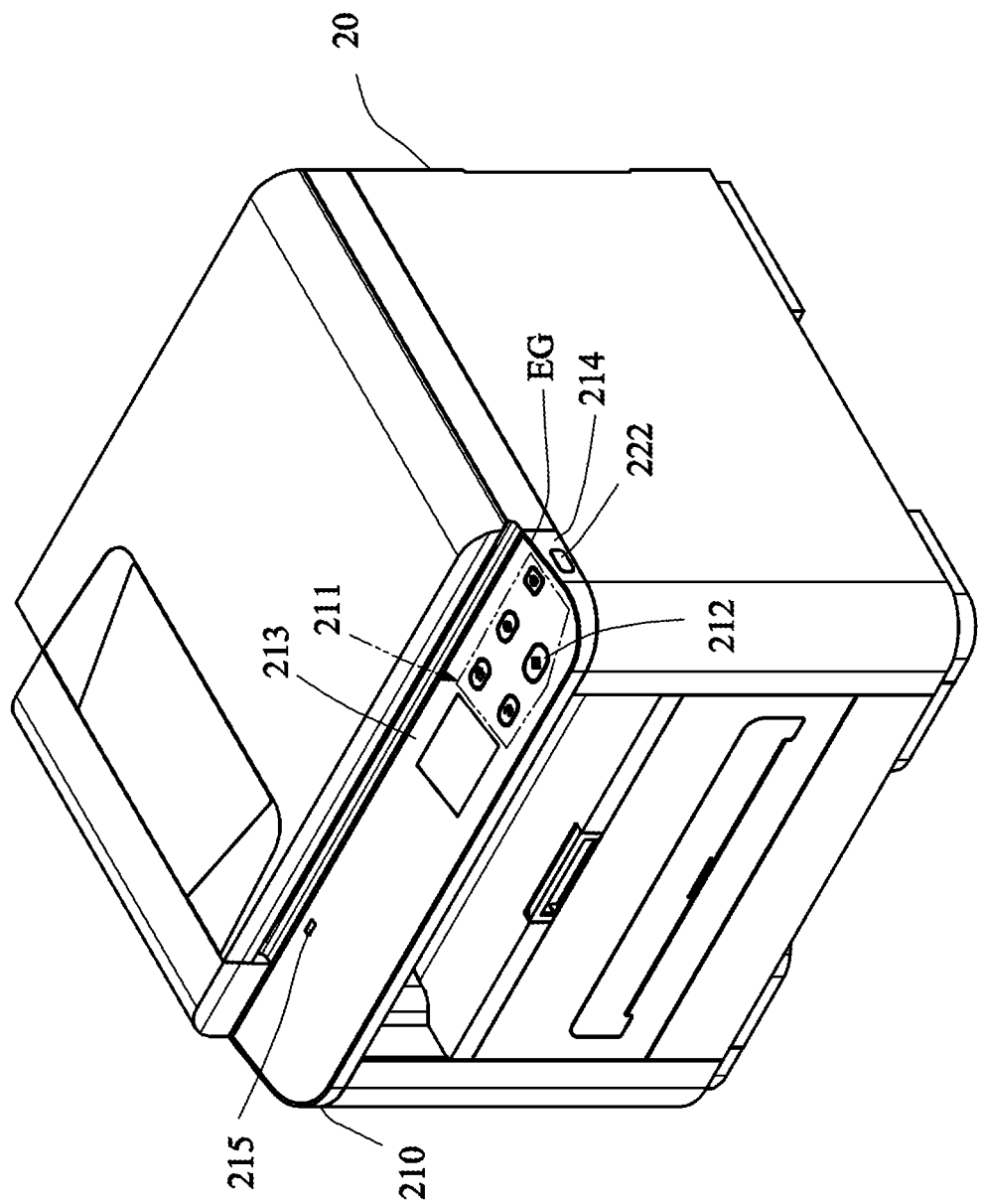
FIG. 2 is a pictorial view showing a peripheral according to a first embodiment of this disclosure.
Figure 3:
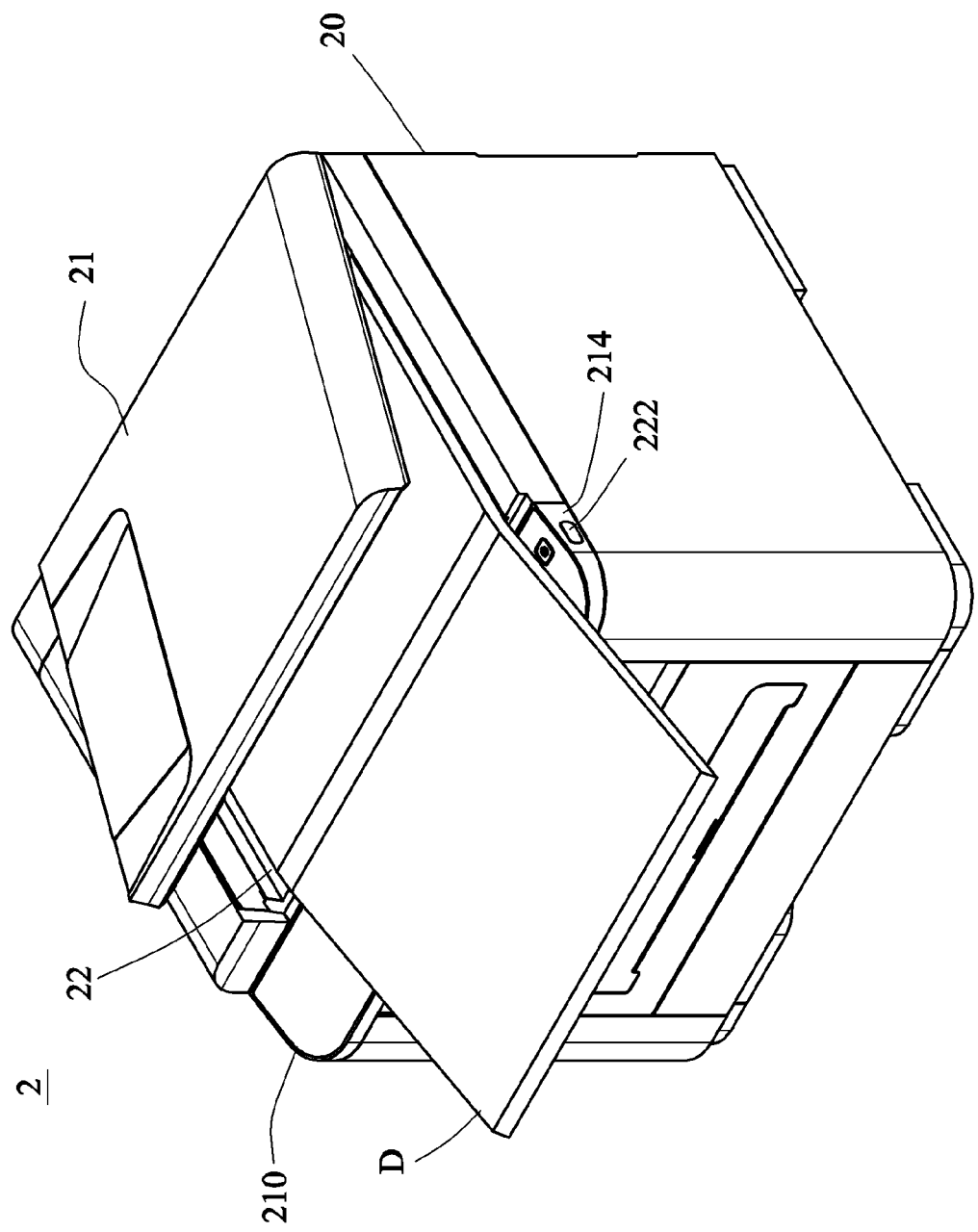
FIG. 3 is a pictorial view showing a used state of the peripheral according to the first embodiment of this disclosure.
Figure 4:
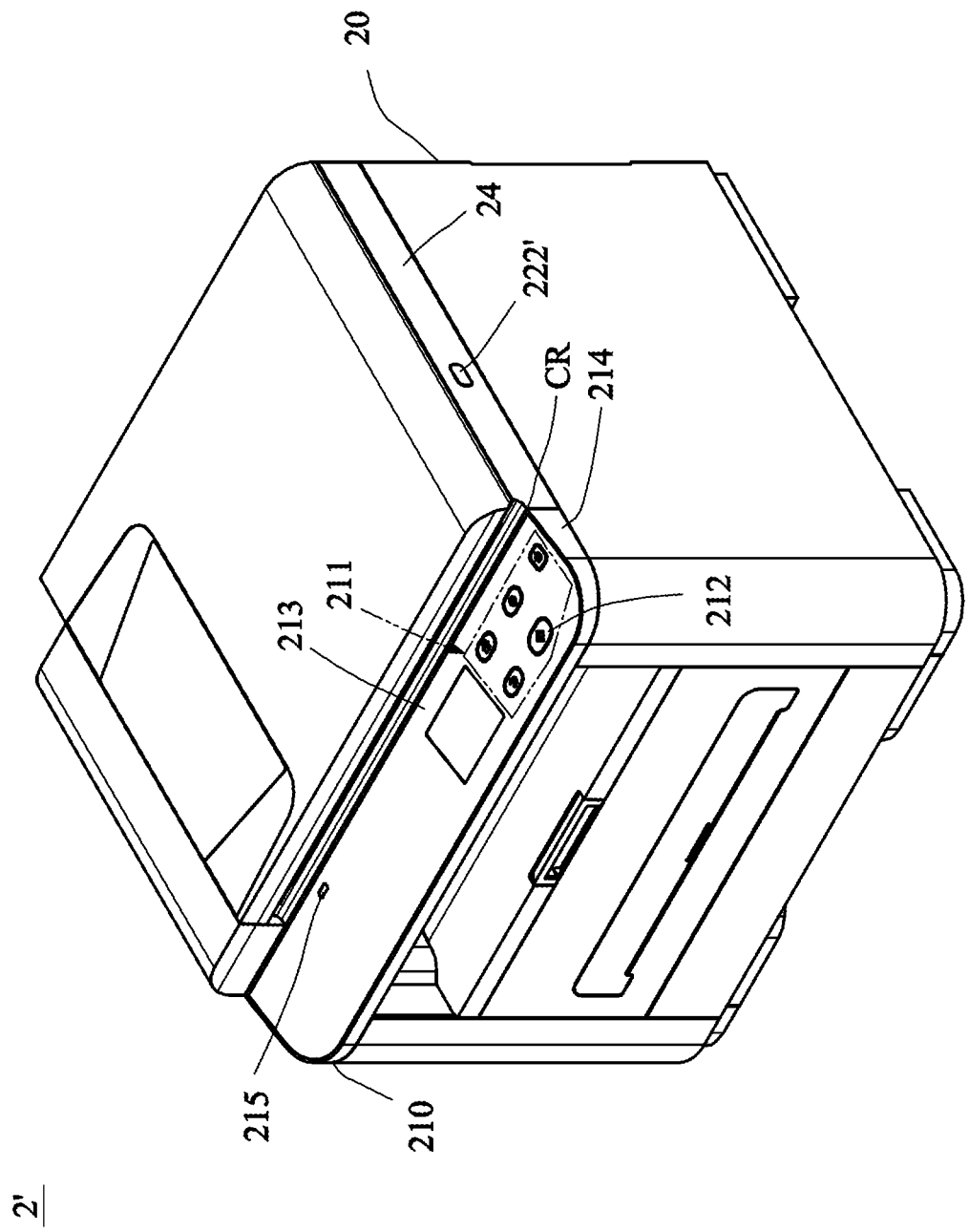
FIG. 4 is a pictorial view showing a peripheral according to a second embodiment of this disclosure.
Figure 5:
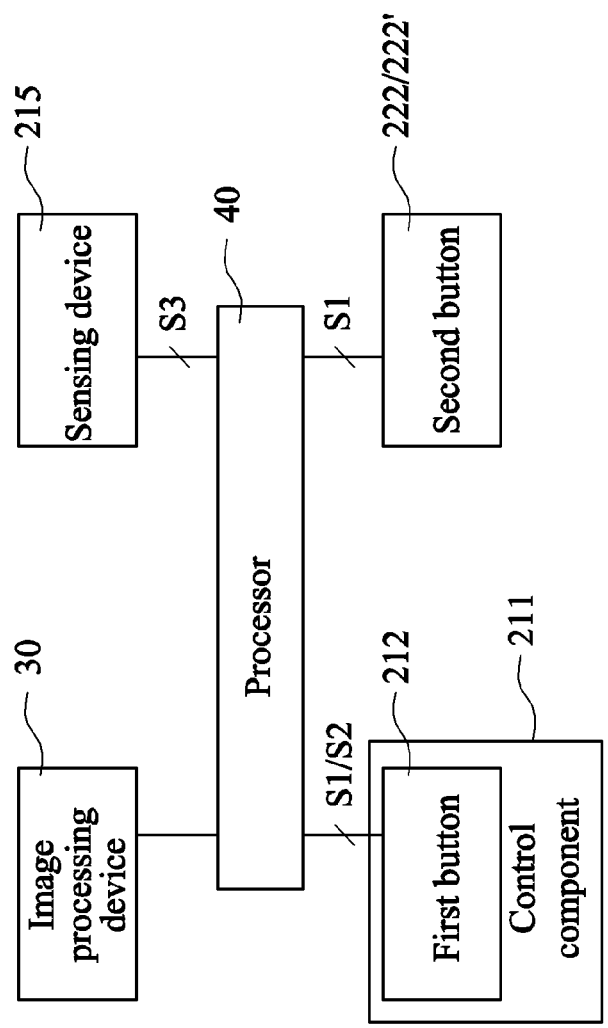
FIG. 5 is a block diagram showing the peripherals according to the first and second embodiments of this disclosure.

FIG. 2 is a pictorial view showing a peripheral 2 according to a first embodiment of this disclosure. FIG. 3 is a pictorial view showing a used state of the peripheral 2 according to the first embodiment of this disclosure. FIG. 4 is a pictorial view showing a peripheral 2' according to a second embodiment of this disclosure. FIG. 5 is a block diagram showing the peripherals according to the first and second embodiments of this disclosure. Referring to FIGS. 2 to 5, the peripheral 2 according to the first embodiment of this disclosure includes a body 20, an image processing device 30 and a processor 40. The body 20 includes a sub-housing 210 and a second button 222. The sub-housing 210 is disposed on one side edge or one side portion of the body 20. The sub-housing 210 includes a control component 211. The control component 211 includes a first button 212 and other buttons (e.g., copy count button, black-and-white/color mode button and the like), and the control component 211 is disposed on an upper surface 213 of the sub-housing 210. The second button 222 mainly faces sidewards when the first button 212 mainly faces upwards, the second button 222 is disposed at a level higher than a level of the first button 212, and the second button 222 is directly physically and electrically connected to the processor 40, in a manner of penetrating through the side edge or the side portion of the body 20. The second button 222 is disposed on one side surface 214 of the sub-housing 210 adjacent to the first button 212, or the second button 222 and the first button 212 are disposed on different adjacent surfaces of the body 20 (e.g., respectively disposed on the side surface 214 and the upper surface 213 of the sub-housing 210, which are directly connected to each other to form an edge EG). The image processing device 30 is disposed above or in the body 20, such as a scanning module having a charge-coupled device (CCD) type image sensor or a contact image sensor (CIS), and acquires an image representative of the medium D. The medium may be a book or a large-size original, for example. The peripheral 2 may further include a sensing device 215, which is disposed on the sub-housing 210 (e.g., the upper surface 213 without any limitative purpose), and senses whether the medium D is present on or above the sub-housing 210 to cover the first button 212 (i.e., whether the medium D extends to cover the first button 212). For example, when the user opens an upper cover 21 of the peripheral 2 and places the medium D onto a scan platen 22 of the peripheral 2 adjacent to the sub-housing 210, the medium D covers the sensing device 215 and the first button 212. However, the sensing device 215 is not the essential device for implementing this disclosure. That is, this disclosure may also be implemented without the sensing device 215. The processor 40 electrically connected to the first button 212 and the second button 222 controls a first signal S1 generated by the first button 212 to be the same as a first signal S1 generated by the second button 222 after the peripheral 2 is powered on and before the peripheral 2 is powered off. For example, the processor 40 regards the first signal S1 generated by the first button 212 and the first signal S1 generated by the second button 222 as the same signal for enabling the image processing device 30 to perform the same operation, such as the image acquiring operation. The sub-housing 210 is disposed on the upper lateral side or one side portion of the body 20.

Referring to FIGS. 4 and 5, the second embodiment provides the peripheral 2' including a body 20, an image processing device 30 and a processor 40. The body 20 includes a sub-housing 210 and a second button 222'. The sub-housing 210 includes a control component 211. The control component 211 includes a first button 212, and the control component 211 is disposed on an upper surface 213 of the sub-housing 210. The second button 222' is disposed on one side surface 24 of the body 20 adjacent to the sub-housing 210, or the second button 222' and the first button 212 are disposed on different adjacent surfaces (e.g., respectively disposed on the side surface 24 of the body 20 and the upper surface 213 of the sub-housing 210, wherein the side surface 24 may also be regarded as the side surface of the housing of the image processing device 30 according to a different definition). So, the different adjacent surfaces (the side surface 24 and the upper surface 213) are directly connected to each other to form a corner CR. The image processing device 30 is disposed above or in the body 20. The peripheral 2' may further include a sensing device 215 for sensing whether a medium is present on or above the sub-housing 210. However, the sensing device 215 is not the essential device for implementing this disclosure. That is, this disclosure may also be implemented without the sensing device 215. The image processing device 30 is disposed above or in the body 20. The processor 40 controls the first signal S1 generated by the first button 212 to be the same as the first signal S1 generated by the second button 222/222'. The sub-housing 210 is disposed on the upper lateral side or one side portion of the body 20.

If the peripheral 2/2' enters the used state (standby state), then the first condition is that the functions of the control component 211 and the second button 222/222' are concurrently enabled. At this time, the sensing device 215 is a photo sensor or a pressure sensor for sensing whether the medium is present on or above the sub-housing 210. If the photo sensor is covered by the medium, then the photo sensor senses changes of the light rays and generates a sensing signal S3 outputted to the processor 40. At this time, the processor 40 correspondingly generates a second signal S2 according to the sensing signal S3 to disable the control function of the control component 211 or the first button 212. If the pressure sensor is covered by the medium, the pressure sensor senses the pressure change or the weight change, and generates the sensing signal S3 outputted to the processor 40. At this time, the processor 40 correspondingly generates the second signal S2 to disable the control function of the control component 211 or the first button 212.

If the peripheral enters the used state (standby state), then the second condition is that the function of the control component 211 is enabled, and the function of the second button 222/222' is kept in and stopped at the disabled state. At this time, the sensing device 215 is a photo sensor or a pressure sensor for sensing whether the medium is present on or above the sub-housing. If the photo sensor is covered by the medium, then the photo sensor senses the changes of the light rays to generate the sensing signal S3 outputted to the processor 40. At this time, the processor 40 correspondingly generates the second signal S2 to disable the control function of the control component 211 or the first button 212 (to disable control component 211 or first button 212 pressed or triggered by the user from starting the scan or copy operation), and to enable the function state of the second button 222/222' so that the second button 222/222' presents an enabled state to wait for the user's triggering. That is, when the first button 212 is enabled by the processor 40, the second button 222/222' is disabled by the processor 40. When the first button 212 is disabled by the processor 40, the second button 222/222' is enabled by the processor 40 to prevent the first button 212 from being enabled upon being pressed by the book. Similarly, if the pressure sensor is covered by the medium, the pressure sensor senses the pressure change or weight change, and generates the sensing signal S3 outputted to the processor 40. At this time, the processor 40 correspondingly generates the second signal S2 to disable the control function of the control component 211 or the first button 212, and to enable the function state of the second button 222/222'. In another example, when the sensing signal S3 is outputted to the processor 40, the processor 40 locks the starting function of the second button 222/222' to a single-page copy function (i.e., only one copy can be reproduced) to prevent multiple copies, such as ten copies previously set by the previous user, from being reproduced in a wasted manner. This is a very utility function when the book is scanned or copied.

Furthermore, in order to facilitate the user in operating the peripheral without being affected by the medium covering the control component 211, the second button 222/222' is disposed on the lateral side or side portion of the body 20 adjacent to the sub-housing 210, or the second button 222/222' is disposed on the lateral side or side portion of the sub-housing 210 adjacent to the first button 212.

Moreover, the first button 212 and the second button 222/222' control the starting operation of the image processing device 30 of starting the image acquiring operation, and the first button 212 and the second button 222/222' make the processor 40 generate scan instructions (for performing image acquiring or image data outputting) or copy instructions (for performing image copying or outputting reproduced copies).

In the embodiment of this disclosure, the first signal S1 controls the starting operation of the image processing device 30, and the first signal S1 is representative of a scan instruction or a copy instruction.

Figure 6:
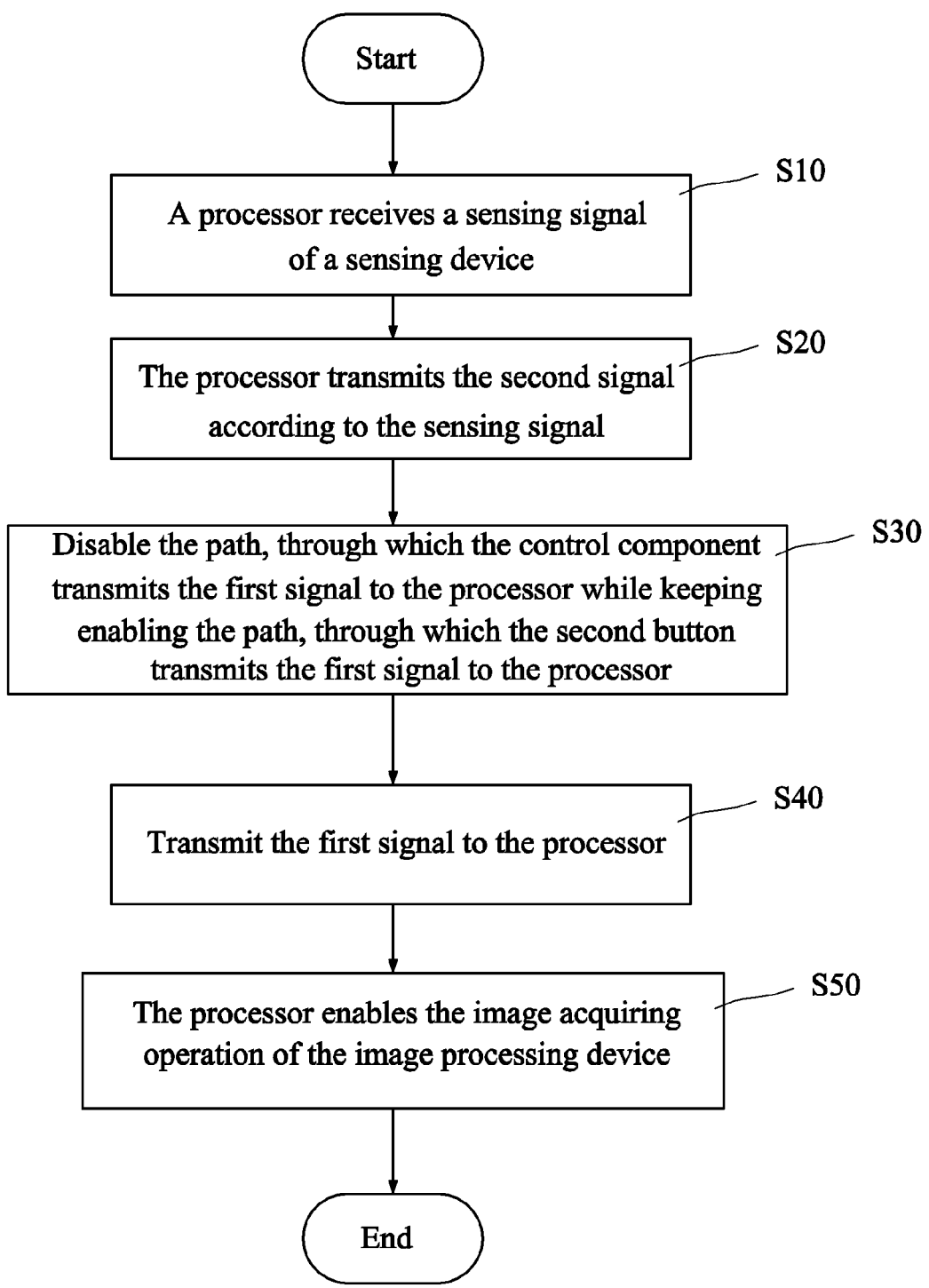
FIG. 6 is a flow chart showing a control method of the peripheral of this disclosure.

If the peripheral 2/2' enters the used state, then the first condition is that the functions of the control component 211 and the second button 222/222' are concurrently enabled. Please refer to FIG. 6, which is a flow chart showing a control method of the peripheral 2/2' of this disclosure, in conjunction with FIGS. 2 to 5, the control method of the peripheral includes the following steps. The processor 40 receives the sensing signal S3 of the sensing device 215 (step S10). Next, the processor 40 transmits the second signal S2 according to the sensing signal S3 (step S20) to disable the path, through which the control component 211 transmits the first signal S1 to the processor 40 (this path is changed from the turn-on state to the turn-off state) while keeping enabling the path, through which the second button 222/222' transmits the first signal S1 to the processor 40 (this path is always kept in the turn-on state) (step S30).

Furthermore, when the first signal S1 is transmitted to the processor 40 (step S40), the processor 40 enables the image acquiring operation of the image processing device 30 (step S50).

Figure 7:
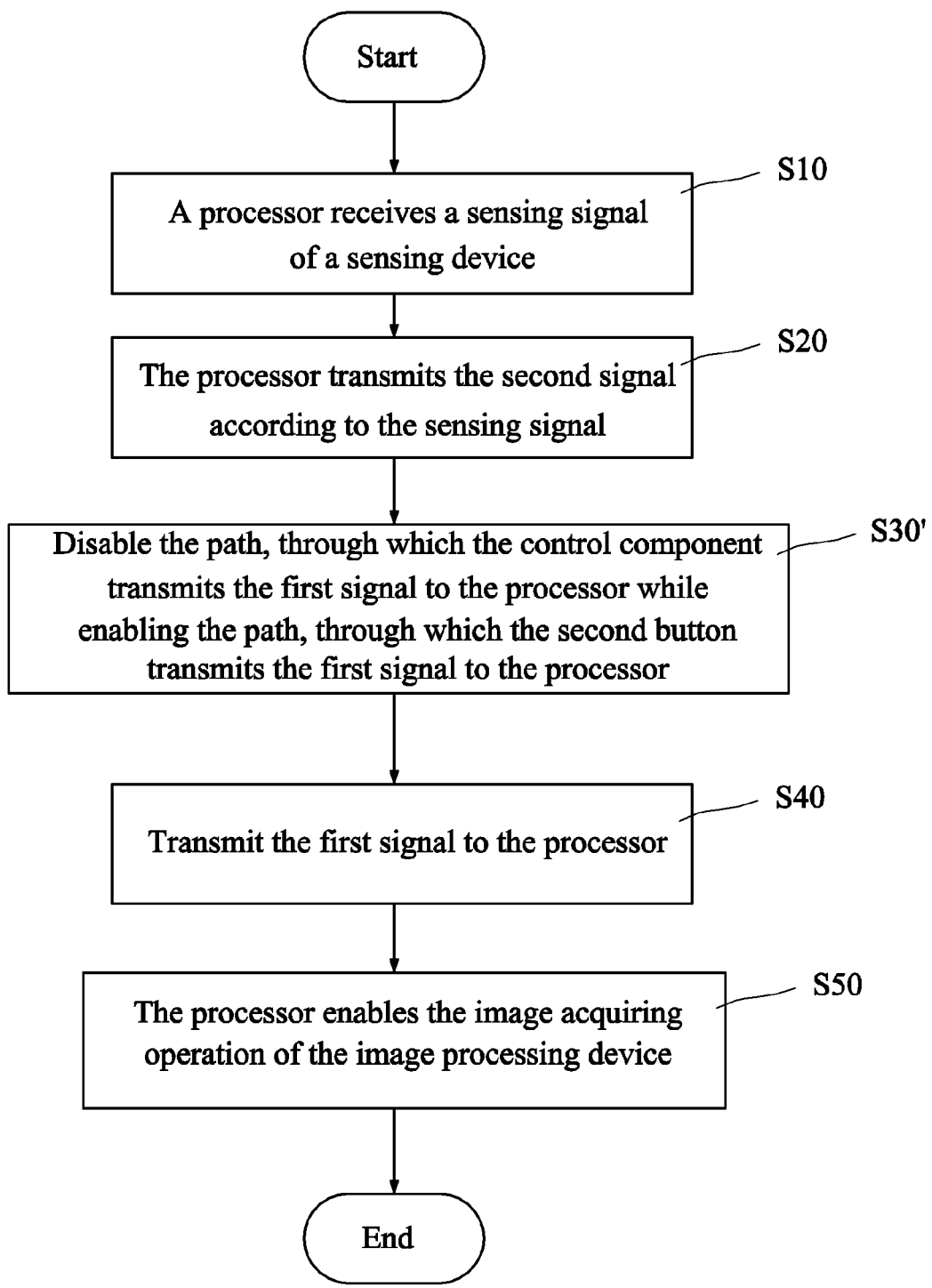
FIG. 7 is a flow chart showing another control method according to the peripheral of this disclosure.

If the peripheral 2/2' enters the used state, then the second condition is that the function of the control component 211 is enabled, and the function of the second button 222/222' is kept in the disabled state. Please refer to FIG. 7, which is a flow chart showing the control method of the peripheral of this disclosure, in conjunction with FIGS. 2 to 5, the control method of the peripheral 2/2' includes the following steps. The processor 40 senses the sensing signal S3 of the sensing device 215 (step S10). Then, the processor 40 transmits the second signal S2 according to the sensing signal S3 (step S20) to disable the path, through which the control component 211 transmits the first signal S1 to the processor 40 (the path is changed from the turn-on state to the turn-off state). Meanwhile, the path, through which the second button 222/222' transmits the first signal S1 to the processor 40, is enabled (this path is changed from the turn-off state to the turn-on state) (step S30'). In another example, the peripheral can output an audio or sound message to the user through a speaker (not shown) to inform the user about the position of the second button to guide the user to press the second button. Alternatively, the second button may be provided with a button indicator, which flashes to guide the user to complete the pressing operation.

Furthermore, when the first signal S1 is transmitted to the processor 40 (step S40), the image acquiring operation of the image processing device 30 is enabled (step S50).

With the above-mentioned embodiments, the second button for correspondingly operating the image processing device is disposed on the side surface or side portion of the body or the sub-housing to function as the reserve control button when the control panel is covered by the medium. Consequently, the user is free from the trouble of operating the peripheral when the control component is covered by the medium, and the convenience of use can be enhanced.

While this disclosure has been described by way of examples and in terms of preferred embodiments, it is to be understood that this disclosure is not limited thereto. To the contrary, it is intended to cover various modifications. Therefore, the scope of the appended claims should be accorded the broadest interpretation so as to encompass all such modifications.

What is claimed is:

1. A peripheral, comprising:
    a body, comprising:
        a sub-housing comprising a control component, which comprises a first button and is placed on an upper surface of the sub-housing; and
        a second button, wherein the second button and the first button are disposed on different adjacent surfaces of the body;
    an image processing device disposed above or in the body; and
    a processor controlling a first signal generated by the first button to be the same as a first signal generated by the second button;
    wherein the sub-housing is disposed on one side edge or one side portion of the body, wherein the second button, which is directly physically and electrically connected to the processor and generates the first signal to start an image acquiring operation of the image processing device of acquiring an image representative of a medium placed on a scan platen of the peripheral adjacent to the sub-housing, after the control component is enabled, upon being pressed by a user, mainly faces sidewards when the first button mainly faces upwards.

2. The peripheral according to claim 1, further comprising a sensing device, which is disposed on the sub-housing and senses whether the medium extends to cover the sub-housing and the first button to facilitate the user in operating the peripheral without being affected by the medium covering the first button.

3. The peripheral according to claim 2, wherein the sensing device is a photo sensor or a pressure sensor sensing whether the medium is present on or above the sub-housing.

4. The peripheral according to claim 2, wherein the sensing device generates a sensing signal when the sensing device senses presence of the medium or above the sub-housing to cover the first button, and the processor correspondingly generates a second signal to disable a control function of the control component and to enable a function state of the second button according to the sensing signal.

5. The peripheral according to claim 1, wherein the second button is disposed on one side surface of the body adjacent to the sub-housing, and the second button is disposed at a level higher than a level of the first button.

6. The peripheral according to claim 1, wherein the second button is disposed on one side surface of the sub-housing adjacent to the first button, and the second button is disposed at a level higher than a level of the first button.

7. The peripheral according to claim 1, wherein the first button and the second button generate a scan instruction or a copy instruction.

8. The peripheral according to claim 1, wherein the first signal is representative of a scan instruction or a copy instruction.

9. The peripheral according to claim 1, wherein the different adjacent surfaces of the body are directly connected to each other to form an edge.

10. The peripheral according to claim 1, wherein the different adjacent surfaces of the body are directly connected to each other to form a corner.

11. The peripheral according to claim 1, wherein there is one and only one button, which is disposed on one of the different adjacent surfaces of the body to control an operation of the image processing device, and is the second button.

12. The peripheral according to claim 1, wherein the processor controls the first signal generated by the first button to be the same as the first signal generated by the second button after the peripheral is powered on and before the peripheral is powered off.

13. The peripheral according to claim 1, wherein the first signal generated by the second button starts the image acquiring operation of the image processing device after the peripheral is powered on and before the peripheral is powered off.

14. The peripheral according to claim 1, wherein the second button is directly physically and electrically connected to the processor in a manner of penetrating through the side edge or the side portion of the body.

15. A control method of a control component of a peripheral, comprising:
receiving, by a processor of the peripheral, a sensing signal of a sensing device generated after sensing a condition that an image representative of a medium, which is placed on a platen adjacent to a sub-housing of the peripheral and to be scanned by an image processing device of the peripheral, extends to cover the sub-housing and a first button of the peripheral, wherein the sub-housing comprises the control component, which comprises the first button and is placed on an upper surface of the sub-housing;
transmitting, by the processor, a second signal according to the sensing signal; and
disabling, by the processor, a path, through which the control component transmits a first signal to the processor, while enabling, by the processor, a path, through which a second button transmits the first signal to the processor.

16. The control method according to claim 15, wherein when the first signal is transmitted to the processor, the processor starts an image acquiring operation of the image processing device of the peripheral.

17. The control method according to claim 15, wherein when the sensing signal is transmitted to the processor, the processor locks a starting function of the second button as a single-page copy function.

18. A control method of a control component of a peripheral, comprising:
receiving, by a processor, a sensing signal of a sensing device generated after sensing a condition that an image representative of a medium, which is placed on a platen adjacent to a sub-housing of the peripheral and to be scanned by an image processing device of the peripheral, extends to cover the sub-housing and a first button of the peripheral, wherein the sub-housing comprises the control component, which comprises the first button and is placed on an upper surface of the sub-housing;
transmitting, by the processor, a second signal according to the sensing signal; and
disabling, by the processor, a path, through which the control component transmits a first signal to the processor, while keeping, by the processor, enabling a path, through which a second button transmits the first signal to the processor.

* * * * *